United States Patent
Lu

(10) Patent No.: US 11,456,774 B2
(45) Date of Patent: Sep. 27, 2022

(54) ELECTRONIC DEVICE, METHOD, AND STORAGE MEDIUM FOR ENHANCING UPSTREAM TRANSMISSION PERFORMANCE

(71) Applicant: ARRIS Enterprises LLC, Suwanee, GA (US)

(72) Inventor: Wei Lu, Shenzhen (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/488,960

(22) Filed: Sep. 29, 2021

(65) Prior Publication Data

US 2022/0103202 A1    Mar. 31, 2022

(30) Foreign Application Priority Data

Sep. 30, 2020   (CN) .......................... 202011060281.1

(51) Int. Cl.
*H04B 3/46*   (2015.01)
*H04B 17/11*  (2015.01)
*H04B 3/54*   (2006.01)
*H04B 3/56*   (2006.01)

(52) U.S. Cl.
CPC ............. *H04B 3/46* (2013.01); *H04B 3/546* (2013.01); *H04B 3/56* (2013.01); *H04B 17/11* (2015.01)

(58) Field of Classification Search
CPC .......... H04B 3/46; H04B 17/11; H04B 3/546; H04B 3/56; H04N 7/17309; H04N 21/6168; H04N 21/6118; H04L 43/0876; H04L 47/12; H04L 47/24; H04L 47/6215
See application file for complete search history.

(56) References Cited

U.S. PATENT DOCUMENTS 7,958,534 B1    6/2011  Beser
8,255,682 B2 *  8/2012  Zeng ................. H04L 63/08
                                                713/168

(Continued)

OTHER PUBLICATIONS

International Search Report and Written Opinion of the International Searching Authority dated Jan. 20, 2022, in International (PCT) Application No. PCT/US2021/052577.

*Primary Examiner* — Khanh C Tran
(74) *Attorney, Agent, or Firm* — Wenderoth, Lind & Ponack, L.L.P.

(57) ABSTRACT

The present disclosure relates to an electronic device, a method, and a storage medium for enhancing upstream transmission performance. In an embodiment, a cable modem termination system (CMTS) can be configured to acquire first transmission performance of an upstream channel of a cable modem (CM) based on receiving service flow transmission from the CM; and, in response to the first transmission performance of at least one upstream channel of the CM being lower than a first threshold, instruct the CM to stop or suspend the service flow transmission through the at least one upstream channel. In an embodiment, the CM can be configured to receive a first instruction from the CMTS during the transmission of the service flow through the upstream channel; and, in response to receiving the first instruction, stop or suspend the service flow transmission through the at least one upstream channel.

16 Claims, 7 Drawing Sheets

(56) References Cited

U.S. PATENT DOCUMENTS

| | | | |
|---|---|---|---|
| 2004/0100906 A1* | 5/2004 | Gay | H04L 47/58 370/235 |
| 2005/0122996 A1 | 6/2005 | Azenkot et al. | |
| 2010/0246582 A1* | 9/2010 | Salinger | H04L 12/2801 370/392 |
| 2013/0088961 A1* | 4/2013 | Ramachandran | H04L 47/125 370/235 |
| 2016/0308827 A1* | 10/2016 | Zhang | H04L 65/1073 |

* cited by examiner

ELECTRONIC DEVICE, METHOD, AND STORAGE MEDIUM FOR ENHANCING UPSTREAM TRANSMISSION PERFORMANCE

TECHNICAL FIELD

The present disclosure generally relates to communication systems, and in particular, to an electronic device, a method, and a storage medium for enhancing upstream transmission performance of cable networks.

BACKGROUND ART

Cable networks have been doing well in meeting people's data communication needs for a long time. As an example, cable networks may conform to the Data-Over-Cable Service Interface Specification (DOCSIS). DOCSIS is a set of communication technology specifications released by CableLabs, and they define industry standards for high-speed data transmission through cable networks. DOCSIS puts forward needs and goals related to high-speed data transmission through cable networks, relating to, for example, network layer, data link layer, physical layer, operation support system, data interface and other aspects.

Main devices of cable networks include cable modem termination systems (CMTS) and cable modems (CM), etc. Generally, the transmission from CMTS to CM is called downstream transmission, and the transmission from CM to CMTS is called upstream transmission. In order to meet more upstream transmission needs, the upstream transmission performance of cable networks has been continuously enhanced. For example, the specification DOCSIS 3.0 can achieve a maximum upload speed of 245.76 Mbps, and the specification DOCSIS 3.1 can increase the maximum upload speed to 2 Gbps. It can be seen it is desired to enhance the upstream transmission performance in cable networks.

SUMMARY OF THE INVENTION

A first aspect of the present disclosure relates to an electronic device for a cable modem termination system (CMTS). The electronic device includes a memory and one or more processors. The memory has instructions stored thereon, and the one or more processors are configured to execute the instructions to cause the CMTS to perform operations including: acquiring first transmission performance of an upstream channel of a cable modem (CM) based on receiving service flow transmission from the CM; in response to the first transmission performance of at least one upstream channel of the CM being lower than a first threshold, instructing the CM to stop or suspend the service flow transmission through the at least one upstream channel.

In an embodiment, the operation of instructing to stop or suspend includes: indicating information of the at least one upstream channel to the CM to cause the CM to stop or suspend the service flow transmission through the at least one upstream channel; or re-authorizing one or more upstream channels for service flow transmission to the CM.

In an embodiment, when the at least one upstream channel and one or more other upstream channels form a first binding group, the operation of instructing to stop or suspend includes: instructing the CM to stop or suspend service flow transmission through the first binding group; or instructing the CM to perform service flow transmission through a second binding group, where the second binding group does not include the at least one upstream channel.

In an embodiment, the operation further includes: acquiring second transmission performance of the at least one upstream channel based on receiving test message transmission from the CM; in response to the second transmission performance of the at least one upstream channel being higher than a second threshold, instructing the CM to start or continue the service flow transmission through the at least one upstream channel.

In an embodiment, the operation of instructing to start or continue includes: indicating information of the at least one upstream channel to the CM to cause the CM to start or continue the service flow transmission through the at least one upstream channel; or re-authorizing one or more upstream channels for service flow transmission to the CM.

In an embodiment, when the at least one upstream channel and one or more other upstream channels are bound as a first binding group, the operation of instructing to start or continue includes: instructing the CM to perform service flow transmission through a third binding group, where the third binding group includes the at least one upstream channel.

In an embodiment, at least one of the following exists: the first transmission performance is acquired based on receiving service flow transmission through a corresponding upstream channel multiple times; the second transmission performance is acquired based on receiving test message transmission through a corresponding upstream channel multiple times; the instruction of stopping or suspending is in response to the first transmission performance of the at least one upstream channel being lower than a first threshold for a first time period; or the instruction of starting or continuing is in response to the second transmission performance of the at least one upstream channel being higher than a second threshold for a second time period.

A second aspect of the present disclosure relates to an electronic device for a cable modem (CM). The electronic device includes a memory and one or more processors. The memory has instructions stored thereon, and the one or more processors are configured to execute the instructions to cause the CM to perform operations including: receiving a first instruction from a cable modem termination system (CMTS) during transmission of service flow through an upstream channel; and in response to receiving the first instruction, stopping or suspending the service flow transmission through the at least one upstream channel.

In an embodiment, when the at least one upstream channel and one or more other upstream channels form a first binding group, stopping or suspending the service flow transmission includes: stopping or suspending service flow transmission through the first binding group; or performing service flow transmission through a second binding group, where the second binding group does not include the at least one upstream channel.

In an embodiment, the operation further includes: receiving a second instruction from the CMTS; and in response to receiving the second instruction, starting or continuing the service flow transmission through the at least one upstream channel.

In an embodiment, the first instruction or the second instruction from the CMTS includes at least one of the following: information of the at least one upstream channel; or re-authorization of one or more upstream channels for service flow transmission.

In an embodiment, when the at least one upstream channel and one or more other upstream channels form a first binding group, starting or continuing the service flow transmission includes: performing service flow transmission through a third binding group, where the third binding group includes the at least one upstream channel.

A third aspect of the present disclosure relates to a method for a CMTS. The method includes acquiring first transmission performance of an upstream channel of a CM based on receiving service flow transmission from the CM; in response to the first transmission performance of at least one upstream channel of the CM being lower than a first threshold, instructing the CM to stop or suspend the service flow transmission through the at least one upstream channel.

In an embodiment, the method further includes acquiring second transmission performance of the at least one upstream channel based on receiving test message transmission from the CM; in response to the second transmission performance of the at least one upstream channel being higher than a second threshold, instructing the CM to start or continue the service flow transmission through the at least one upstream channel.

A fourth aspect of the present disclosure relates to a method for a CM. The method includes receiving a first instruction from a CMTS during transmission of service flow through an upstream channel; and in response to receiving the first instruction, stopping or suspending the service flow transmission through at least one upstream channel.

In an embodiment, the method further includes receiving a second instruction from the CMTS; and in response to receiving the second instruction, starting or continuing the service flow transmission through the at least one upstream channel.

A fifth aspect of the present disclosure relates to a non-transitory computer-readable storage medium having instructions stored thereon. When executed by one or more processors, the instructions cause implementation of operations of the method according to the embodiments of the present disclosure.

BRIEF DESCRIPTION OF THE DRAWINGS

For a better understanding of the present disclosure and to show how to implement the present disclosure, description will be made with reference to the drawings by way of examples. It should be noted that throughout the drawings, similar reference numerals and signs refer to corresponding parts. In which.

DESCRIPTION OF EMBODIMENTS

The following detailed description is made with reference to the attached drawings, and the following detailed description is provided to facilitate comprehensive understanding of various exemplary embodiments of the present disclosure. The following description includes various details to facilitate understanding. However, these details are merely considered as examples, not for limiting the present disclosure. The present disclosure is defined by the appended claims and their equivalents. The words and phrases used in the following description are only used to enable a clear and consistent understanding of the present disclosure. In addition, for clarity and brevity, descriptions of well-known structures, functions, and configurations may be omitted. Those of ordinary skill in the art will realize that various changes and modifications can be made to the examples described in the present specification without departing from the gist and scope of the present disclosure.

Figure 1:
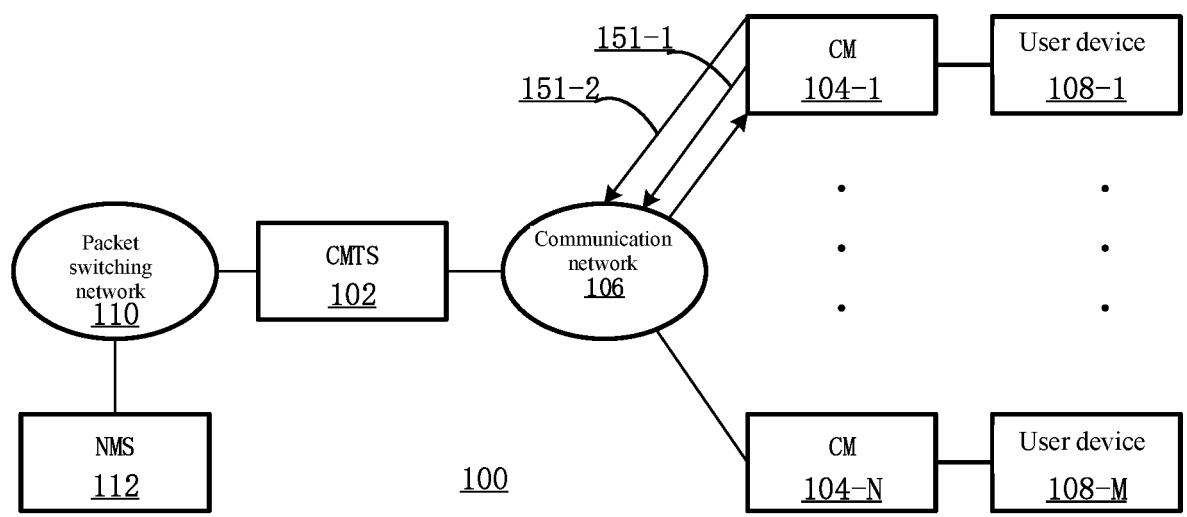
FIG. 1 shows an exemplary cable network system according to an embodiment of the present disclosure.

FIG. 1 shows an exemplary cable network system according to an embodiment of the present disclosure. A cable network system 100 can provide various communication services through upstream and downstream transmission of service flow. The communication services include voice communication, video communication, data services, instant messaging, other forms of media and/or multimedia services, or any combination of the above. For example, the communication services may be cable TV services, Internet services, radio broadcasting, email, messaging, video conferences, live media or relay broadcasting, etc. The term service flow is a concept in the DOCSIS protocols and refers to a flow of packets that are guaranteed an allocation of a particular bandwidth so as to ensure a quality of service (QoS). A service flow can be a MAC layer transport service which provides transport of packets from an upper layer service entity to RF. In the context of the present disclosure, the upstream or downstream transmission of the service flow can include transmission of corresponding packets.

As shown in FIG. 1, the cable network system 100 mainly includes a CMTS 102 and one or more CM 104-1 to 104-N (may also be collectively referred to as CM 104), which are communicatively coupled to each other through a communication network 106. Generally, the upstream transmission may include transmitting the service flow from a user device 108 (for example, user devices 108-1 to 108-M, collectively referred to as user device 108) to reach the CMTS 102 via the CM 104 and the communication network 106. The service flow may be further transmitted by the CMTS 102 to other CMs or to a packet switching network 110. The downstream transmission may include transmitting the service flow, which is to be sent to the user device 108, by the CMTS 102 to the user device 108 via the communication network 106 and the CM 104. In an embodiment, the CM 104 and the CMTS 102 may conform to any compatible DOCSIS specification that has been released or will be released in the future, and communicate according to the protocols and/or formats defined by the specification.

As shown in FIG. 1, any one of CM 104-1 to CM 104-N can be used as an interface between the attached corresponding user device 108 and the communication network 106. Examples of the user device 108 include a customer premise equipment (CPE). For example, the user device may be a personal computer, a data terminal device, a telephone device, a broadband media player, or any other device capable of sending or receiving data through a packet switching network. The CM 104 can convert a downstream signal received through the communication network 106 into packet data, and transmit the packet data to the corresponding user device 108. The packet data may conform to, for example, IP, asynchronous transfer mode ATM or other suitable protocols. Additionally, the CM 104 can convert the packet data from the corresponding user device 108 into an upstream signal suitable for transmission through the communication network 106.

The communication network 106 can support various transmission media such as optical fiber, copper wire, twisted pair, and coaxial wire. For example, the communication network 106 may include a hybrid fiber coaxial cable (HFC) network.

As shown in FIG. 1, the CMTS 102 can be used as an interface between the communication network 106 and the packet switching network 110. The CMTS 102 can transmit the packet data from the CM 104 to the packet switching network 110, and transmit the packet data received from the packet switching network 110 to the CM 104. The CMTS 102 can communicate with other devices or applications outside the cable network system 100 via the packet switching network 110. The device or application may be a server, a Web browser, an operating system, other types of information processing applications, a television or radio transmitter, another CMTS or other CMs, etc.

The packet switching network 110 may be a wired network, a wireless network, or a combination of wired and wireless networks. The packet switching network 110 may be a local area network (LAN) or a wide area network (WAN), and may be an Intranet, a local Internet, World Wide Web, a virtual private network, etc. The packet switching network 110 is generally deployed by a network provider. The network provider may also deploy a Network Management System (NMS) 112 to manage the cable network system 100 as a whole and its constituent elements.

In an embodiment, the CM 104 may be located at a customer premise. The CMTS 102 may be implemented as a part of a cable head end and used to manage service flow transmission between the cable head end and one or more CM 104. The service flow may be transmitted between the CMTS 102 and the CM 104 in time division multiplexing (TDM), code division multiplexing (CDM), frequency division multiplexing (FDM), etc., and the present disclosure does not limit in this aspect.

In an embodiment, the CMTS 102 and the CM 104 can perform service flow transmission through one or more upstream channels and one or more downstream channels. As an example, FIG. 1 shows two upstream channels 151-1 and 151-2. Those skilled in the art can understand that more upstream channels may be used. For example, there may be 4, 6, 8, 10, 16, 34, 64, etc., upstream channels. Each upstream channel may correspond to, for example, subcarriers with bandwidths of 6 MHz, 6.4 MHz, 8 MHz and other sizes (for example, equal to or less than 95 MHz). The number and size of the subcarriers may vary according to requirements, and the subcarriers do not have to be adjacent in the frequency domain. Each upstream channel or subcarrier may support various modulation methods, including but not limited to SC-QAM, OFDM/OFDMA. The above can also be applied to a downstream channel.

In an embodiment, each upstream or downstream channel can be divided into multiple assignable time slots. The CMTS 102 can define the time slot structure and allocate time slots for upstream or downstream transmission. The packet data of the service flow can be scheduled in multiple time slots in multiple channels at the same time, that is, channel binding. In the present disclosure, the multiple channels of the packet data of the service flow scheduled at the same time may be called a binding group, and the scheduled service flow may be called a binding service flow. In an embodiment, the binding group may include multiple channels in a single or mixed modulation mode. For example, a bound channel may only include channels that support SC-QAM or OFDM/OFDMA, or may include channels that support SC-QAM or OFDM/OFDMA, respectively. As an example, the binding group may include 32 SC-QAM channels and 2 OFDM channels, or may include 8 SC-QAM channels and 2 OFDMA channels.

The CMTS 102 can allocate the packet data of a single service flow in multiple channels. In the downstream direction, the packet data may generally include a downstream service extension header that includes the sequence number of the packet data, and the sequence number allows the CM 104 to reorder out-of-order packet data. In the upstream direction, the CM 104 segments the service flow, and allocates the obtained packet data segment to the authorized time-frequency resource scheduled by the CMTS 102 for the service flow. The time-frequency resource may correspond to one or more upstream channels. Each packet data segment may have a sequence number to allow the CMTS 102 to reorder the received out-of-order packet data segments.

It should be understood that the number of each device shown in FIG. 1 is merely an example. The cable network system 100 can include any number of CMTS 102, the CMTS 102 can be coupled to and control any number of CM 104, and the CM 104 can serve any number of user devices 108. Each device in FIG. 1 can perform various operations for enhancing upstream transmission performance according to the present disclosure, such as the ones described in detail below.

Figure 2:
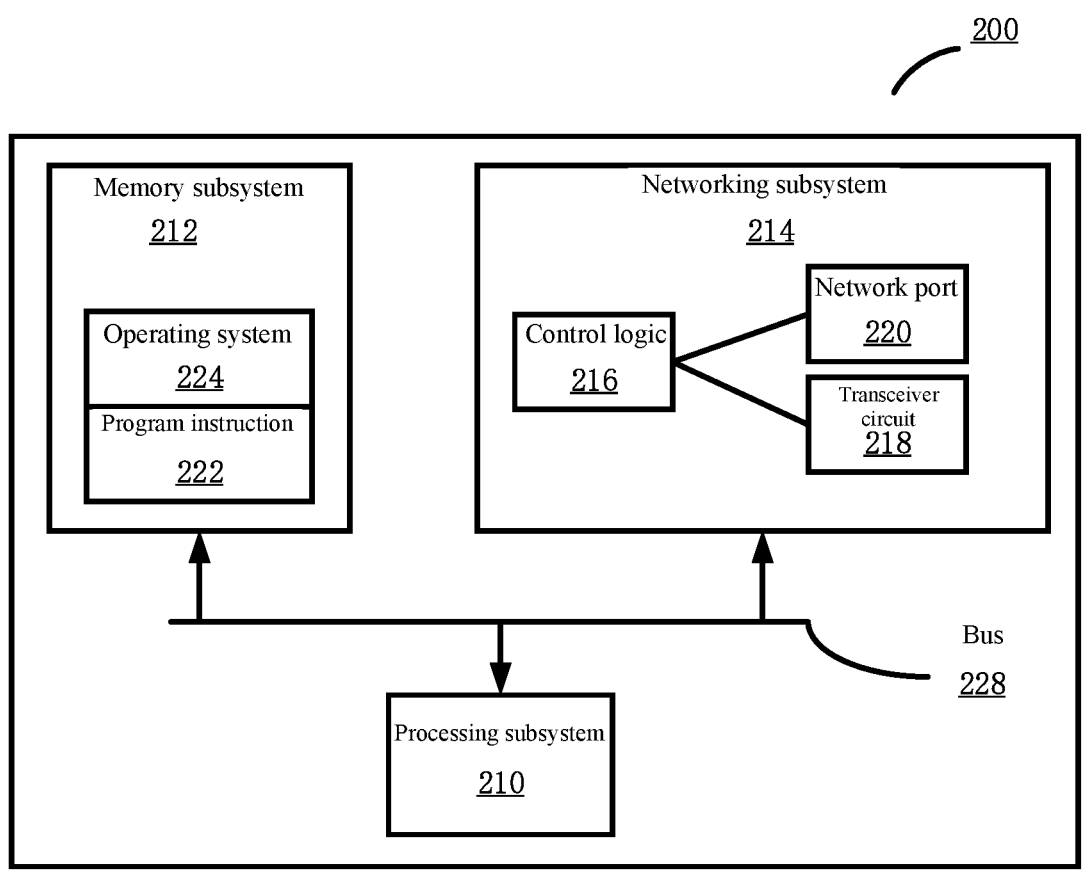
FIG. 2 shows an exemplary block diagram of an electronic device for implementing CMTS according to an embodiment of the present disclosure.

FIG. 2 shows an exemplary block diagram of an electronic device for implementing CMTS according to an embodiment of the present disclosure. The electronic device 200 can be used to implement, for example, the CMTS 102 in FIG. 1. As shown in FIG. 2, the electronic device 200 includes a processing subsystem 210, a memory subsystem 212, and a networking subsystem 214. The processing subsystem 210 includes one or more devices configured to execute a computing operation. For example, the processing subsystem 210 may include one or more microprocessors, ASICs, microcontrollers, programmable logic devices, graphics processing units (GPU) and/or one or more digital signal processors (DSP).

The memory subsystem 212 comprises one or more devices for storing data and/or instructions used for the processing subsystem 210 and the networking subsystem 214. For example, the memory subsystem 212 may include a dynamic random access memory (DRAM), a static random access memory (SRAM), and/or other types of memory (sometimes collectively or individually referred to as "computer-readable storage medium"). In some embodiments, the instructions in the memory subsystem 212 used for the processing subsystem 210 comprise: one or more program modules or instruction sets (e.g., program instruction 222 or operating system 224), which can be executed by the processing subsystem 210. One or more computer programs may constitute a computer-program mechanism. In addition, instructions in the various modules of the memory subsystem 212 may be implemented by any one of the following: a high-level programming language, an object-oriented programming language, an assembly or machine language. Furthermore, the programming language can be compiled or interpreted, for example, configurable or configured (which may be used interchangeably in the present discussion) so as to be executed by the processing subsystem 210.

The networking subsystem 214 includes one or more devices that are configured to be coupled to wired and/or wireless networks and communicate over the wired and/or wireless networks (i.e., to perform network operations), comprising: a control logic 216, a transceiver circuit 218, and a network port 220. The transceiver circuit 218 may be configured to receive upstream transmission from the CM 104 via, for example, the communication network 106, and send downstream transmission to the CM 104. The transceiver circuit 218 may further execute signal processing at a physical (PHY) layer and a medium access control (MAC) layer, such as data segmentation, concatenation, payload header compression/expansion, and/or error detection. The network port 220 may be configured to be connected to, for example, the packet switching network 110 in FIG. 1.

In the electronic device 200, a bus 228 is used to couple the processing subsystem 210, the memory subsystem 212, and the networking subsystem 214 together. The bus 228 may include electrical, optical, and/or electro-optical connections that a subsystem can use to communicate commands, data, etc.

In an embodiment, the electronic device 200 can be used together with a CM (for example, the CM 104 in FIG. 1). The program instruction 222 may be executed by the processing subsystem 210 to cause the electronic device 200 to execute various operations described herein.

Figure 3:
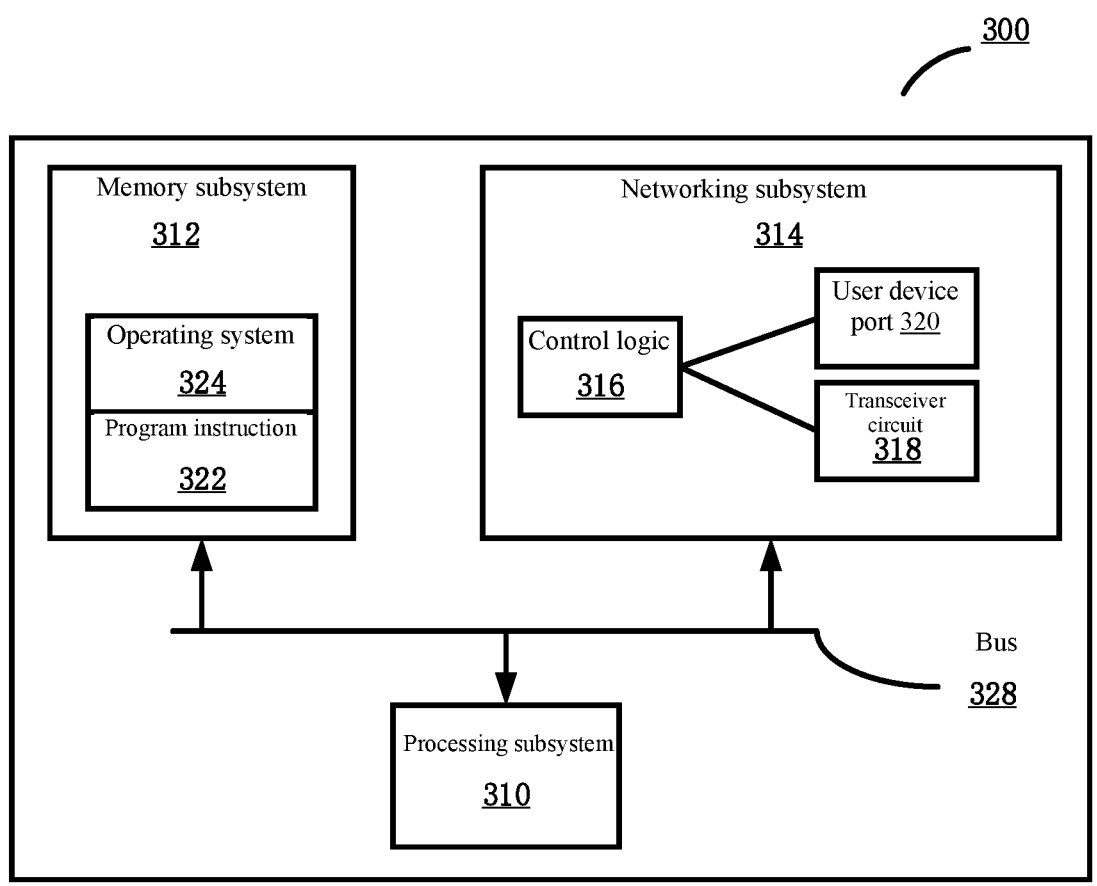
FIG. 3 shows an exemplary block diagram of an electronic device for implementing CM according to an embodiment of the present disclosure.

FIG. 3 shows an exemplary block diagram of an electronic device for implementing CM according to an embodiment of the present disclosure. The electronic device 300 can be used to implement, for example, the CM 104 in FIG. 1. As shown in FIG. 3, the electronic device 300 includes a processing subsystem 310, a memory subsystem 312, and a networking subsystem 314. The processing subsystem 310 includes one or more devices configured to execute a computing operation. For example, the processing subsystem 310 may include one or more microprocessors, ASICs, microcontrollers, programmable logic devices, graphics processing units (GPU) and/or one or more digital signal processors (DSP).

The memory subsystem 312 includes one or more devices for storing data and/or instructions used for the processing subsystem 310 and the networking subsystem 314. For example, the memory subsystem 312 may include a dynamic random access memory (DRAM), a static random access memory (SRAM), and/or other types of memories. In some embodiments, the instructions in the memory subsystem 312 used for the processing subsystem 310 comprise: one or more program modules or instruction sets (e.g., program instruction 322 or operating system 324), which can be executed by the processing subsystem 310. One or more computer programs may constitute a computer-program mechanism. In addition, instructions in the various modules of the memory subsystem 312 may be implemented by any one of the following: a high-level programming language, an object-oriented programming language, an assembly or machine language. Furthermore, the programming language can be compiled or interpreted, for example, configurable or configured (which may be used interchangeably in the discussion hereof) so as to be executed by the processing subsystem 310.

The networking subsystem 314 includes one or more devices that are configured to be coupled to wired and/or wireless networks and communicate over the wired and/or wireless networks (i.e., to perform network operations), comprising: a control logic 316, a transceiver circuit 318, and a user device port 320. The transceiver circuit 318 may be configured to receive downstream transmission from the CMTS 102 via, for example, the communication network 106, and send upstream transmission to the CMTS 102. The transceiver circuit 318 may further execute signal processing at a physical (PHY) layer and a medium access control (MAC) layer, for example, packet data modulation, demodulation, signal filtering and/or power control, etc. In an embodiment, the transceiver circuit 318 may be implemented as a coaxial connector. The user device port 320 may be configured to be connected to the user device 108 in FIG. 1, for example.

In the electronic device 300, a bus 328 is used to couple the processing subsystem 310, the memory subsystem 312, and the networking subsystem 314 together. The bus 328 may include electrical, optical, and/or electro-optical connections that a subsystem can use to communicate commands, data, etc.

In an embodiment, the electronic device 300 can be used together with a CMTS (for example, the CMTS 102 in FIG. 1). The program instruction 322 may be executed by the processing subsystem 310 to cause the electronic device 300 to execute various operations described herein.

Although specific components are used to describe the electronic device 200 or 300, in an alternative embodiment, there may be different components and/or subsystems in the electronic device 200 or 300. For example, the electronic device 200 or 300 may include one or more additional processing subsystems, memory subsystems, and/or networking subsystems. In addition, one or more of the subsystems may not exist in the electronic device 200 or 300. In some embodiments, the electronic device 200 or 300 may include one or more additional subsystems not shown, for example, a display subsystem. Although separate subsystems are shown in the drawings, in some embodiments, some or all of the given subsystems or components may be integrated into one or more of other subsystems or components. For example, in some embodiments, the program instructions are included in the operating system, and/or the control logic is included in the transceiver circuit.

Figure 4A:
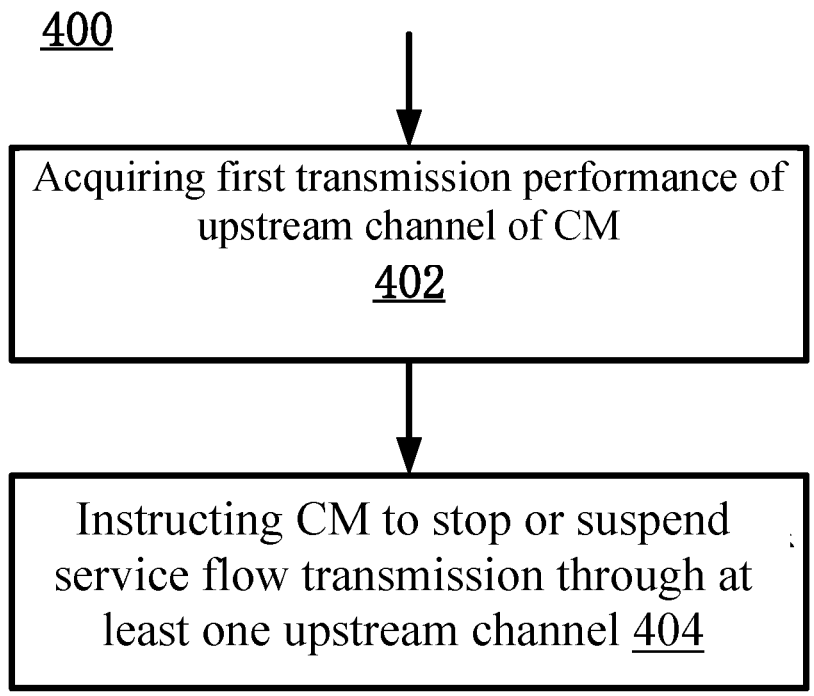
FIG. 4A and FIG. 4B show exemplary processes for CMTS and CM respectively according to an embodiment of the present disclosure.

FIG. 4A shows exemplary processing for CMTS according to an embodiment of the present disclosure. For example, the CMTS 102 in FIG. 1 may perform an exemplary operation 400 to communicate with the CM 104-1, thereby serving the user device 108-1.

As shown in FIG. 4A, the operation 400 includes that the CMTS 102 acquires first transmission performance of an upstream channel of the CM 104-1 (block 402). In an embodiment, the CMTS 102 may acquire corresponding transmission performance of one or more upstream channels based on receiving service flow transmission from the CM 104-1. The operation 400 further includes that, in response to the first transmission performance of at least one upstream channel of the CM 104-1 being lower than a first threshold, the CMTS 102 instructs the CM 104-1 to stop or suspend the service flow transmission through the at least one upstream channel (block 404).

In an embodiment, the first transmission performance may be based on various performance indicators of the corresponding upstream channels, including but not limited to received signal to noise ratio, signal to interference plus noise power ratio, packet loss rate, and bit error rate. Correspondingly, first thresholds may be specified for these performance indicators respectively. For example, a first threshold $T1_{SNR}$ may be specified for the signal to noise ratio. The first threshold may indicate that the transmission performance of the corresponding upstream channel has been degraded to an extent that it affects the normal reception of the service flow, but is not sufficient to determine the upstream channel as impaired (impairment). The first threshold may be conveyed by adding the parameter StopDataLowSNRThreshold or SuspendDataLowSNRThreshold in the DOCSIS specification, and the CM 104 or the CMTS 102 may be configured with this parameter through NMS 112, for example.

Generally speaking, when the transmission performance of the upstream channel (for example, the upstream channel 151-1) starts to degrade, the upstream channel 151-1 may be continuously used for upstream transmission until the upstream channel 151-1 is determined to be damaged. However, the use of the upstream channel 151-1 with degraded transmission performance is not necessarily advantageous for the cable network system. Since the transmission performance of the upstream channel 151-1 has been degraded, the benefit provided to the user device 108-1 by continuing the upstream transmission is not obvious. In contrast, allocating the corresponding upstream transmission time-frequency resources to other CMs or upstream channels is more beneficial to the resource utilization efficiency of the entire system. In this case, continuing the upstream transmission also causes the user device 108-1 to miss the opportunity to change the upstream channel, which is also disadvantageous to the user device 108-1 itself.

According to the operation 400, by monitoring the transmission performance of the upstream channel 151-1, the CM 104-1 can be controlled to stop or suspend the service flow transmission through the upstream channel 150-1. As described above, the corresponding upstream transmission resources can be allocated to other CMs or upstream channels to improve resource utilization efficiency. In an embodiment, different values of the first threshold may be configured, so that the control meets the transmission requirements of one or more user devices and the performance requirements of the cable network system.

Figure 4B:
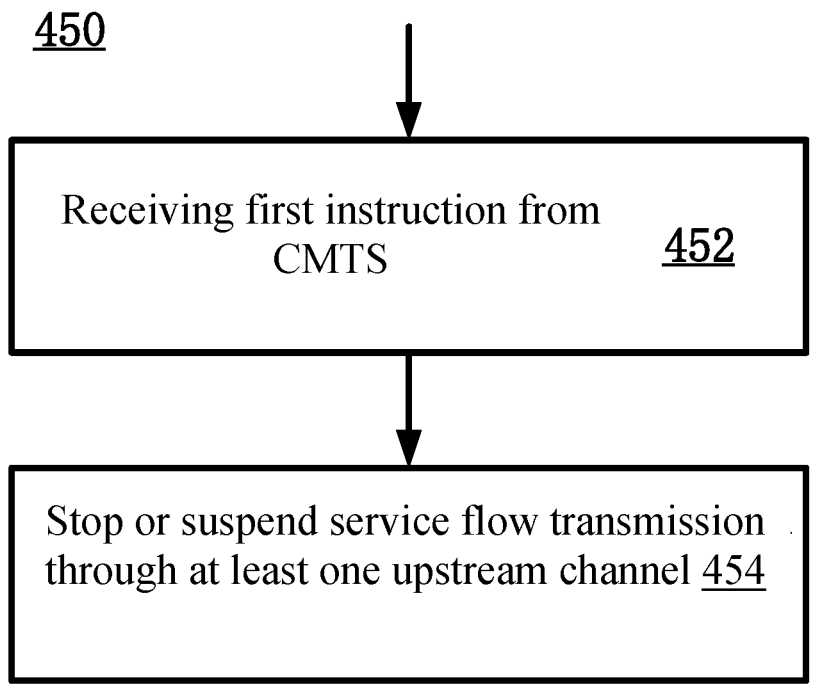

FIG. 4B shows exemplary processing for CM according to an embodiment of the present disclosure. For example, the CM 104-1 in FIG. 1 may perform an exemplary operation 450 to communicate with the CMTS 102, thereby serving the user device 108-1.

As shown in FIG. 4B, the operation 450 includes that the CM 104-1 receives a first instruction from the CMTS 102 during transmission of service flow through an upstream channel (block 452). In an embodiment, the first instruction is used to instruct the CM 104-1 to stop or suspend the service flow transmission through at least one upstream channel. The operation 450 further includes that, in response to receiving the first instruction, the CM 104-1 stops or suspends the service flow transmission through the at least one upstream channel (block 454).

In an embodiment, the first instruction may correspond to a situation where the transmission performance of the upstream channel (for example, the upstream channel 151-1) of the CM 104-1 is degraded.

Figure 5:
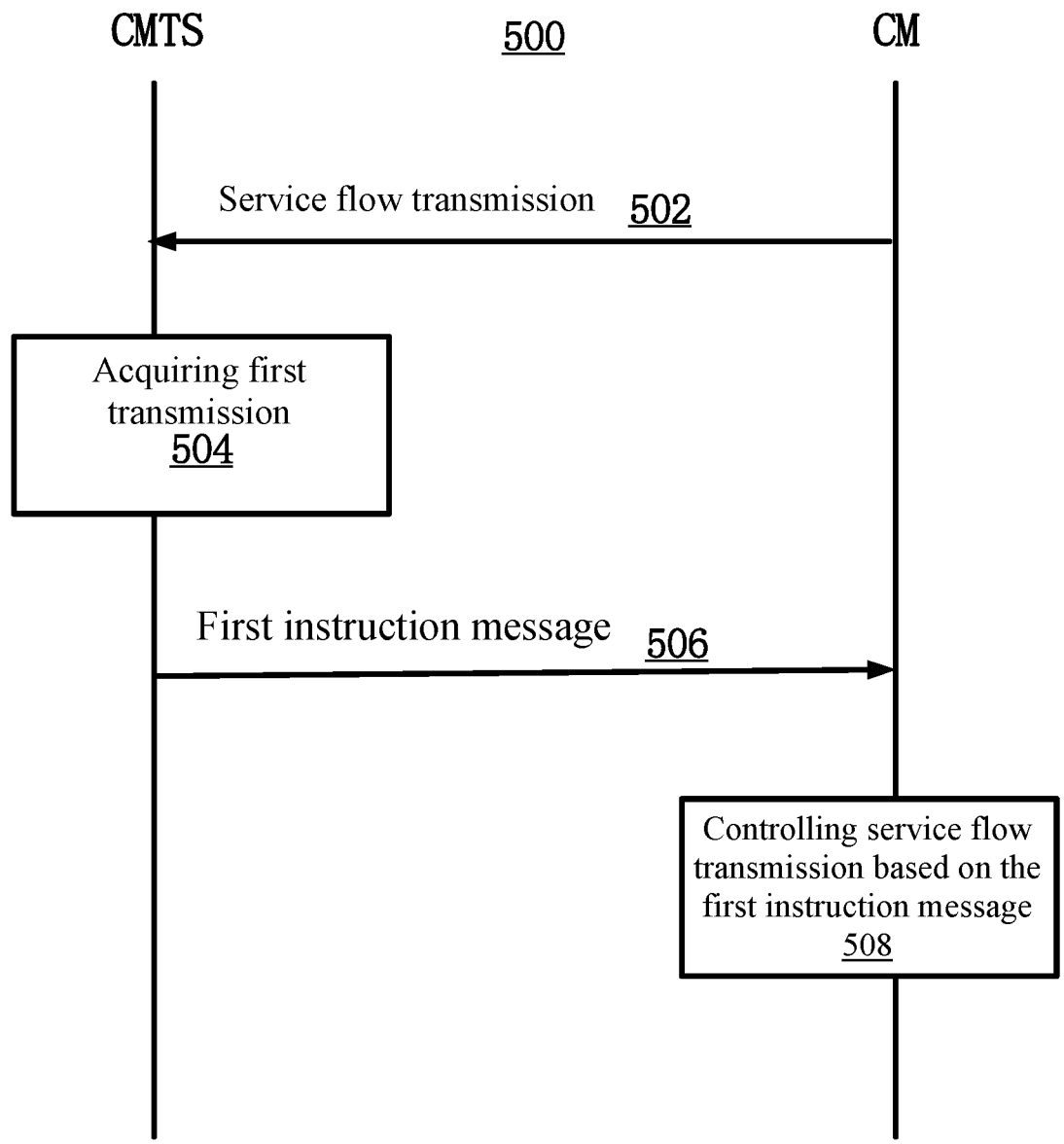
FIG. 5 shows an exemplary signaling flow between CMTS and CM according to an embodiment of the present disclosure.

FIG. 5 shows an exemplary signaling flow between CMTS and CM according to an embodiment of the present disclosure. For example, the signaling flow 500 may be executed between the CMTS 102 and the CM 104-1 in FIG. 1.

As shown in FIG. 5, in 502, the CM 104-1 may transmit service flow to the CMTS 102. In an embodiment, the service flow may be transmitted through a single upstream channel 151-1, that is, the packet data of the service flow is only transmitted to the CMTS 102 in the time slot of the single upstream channel 151-1. In another embodiment, the service flow may be transmitted through a binding group of a plurality of upstream channels 151-1 and 151-2, that is, the packet data of the service flow is transmitted to the CMTS 102 in the time slots distributed in a plurality of upstream channels. The CMTS 102 can authorize time slots in one or more upstream channels for service flow transmission through scheduling. The one or more upstream channels can respectively support different modulation modes, including but not limited to SC-QAM, OFDM/OFDMA. Those skilled in the art can understand that the binding group including the upstream channels 151-1 and 151-2 is merely an example. According to needs, the binding group can include any number of upstream channels, for example, 4, 6, 8, 10, 16, 34, and 64.

In 504, the CMTS 102 may acquire first transmission performance of an upstream channel of the CM 104-1 based on receiving service flow transmission from the CM 104-1. Specifically, the CMTS 102 may acquire the first transmission performance of the upstream channel based on the reception on each upstream channel, so as to control the service flow transmission through the upstream channel. In an embodiment, the first transmission performance is acquired based on receiving service flow transmission through a corresponding upstream channel multiple times.

In 506, in response to the transmission performance of at least one upstream channel of the CM 104-1 being lower than a first threshold, the CMTS 102 may send a first instruction message to the CM 104-1. The first instruction message may be used to instruct the CM 104-1 to stop or suspend the service flow transmission through the at least one upstream channel. In an embodiment, the first instruction message is sent in response to the first transmission performance of the at least one upstream channel being lower than a first threshold for a first time period. The first time period may be conveyed by adding the parameter StopDataLowSNRTimer or SuspendDataLowSNRTimer in the DOCSIS specification, for example, and the CM 104 or the CMTS 102 may be configured with this parameter through the NMS 112, for example. In an embodiment, sending the first instruction message may include indicating the information of the at least one upstream channel to the CM 104-1. Correspondingly, the CM 104-1 may stop or suspend the service flow transmission through the at least one upstream channel, so that the corresponding upstream transmission resources can be used for transmission of other CMs or other upstream channels. Alternatively or additionally, sending the first instruction message may include re-authorizing one or more upstream channels for the service flow transmission to the CM 104-1. Re-authorization can provide the CM 104-1 with an opportunity to change the upstream channel to acquire better transmission performance.

In an embodiment, the upstream channel 151-1 and one or more other upstream channels (for example, the upstream channel 151-2) form a first binding group. When the transmission performance of the upstream channel 151-1 is degraded, sending the first instruction message may include instructing the CM 104-1 to stop or suspend the service flow transmission through the first binding group (which includes the upstream channel 151-1 with degraded transmission performance). Alternatively, sending the first instruction message may include instructing the CM 104-1 to perform service flow transmission through a second binding group, where the second binding group does not include the upstream channel 151-1. For example, the second binding group may include the upstream channel 151-2 and one or more other upstream channels.

In 508, the CM 104-1 receives the first instruction message from the CMTS 102, and controls the service flow transmission based on the first instruction message. For example, in response to receiving the first instruction message, the CM 104-1 may stop or suspend the service flow transmission through at least one upstream channel. In the aforementioned embodiments where there is channel binding, correspondingly, the CM 104-1 may stop or suspend the service flow transmission through the first binding group, for example, or the CM 104-1 may perform the service flow transmission through the second binding group, for example.

It should be noted that in the embodiments where there is channel binding, it is advantageous to stop or suspend the service flow transmission through an upstream channel with degraded transmission performance. In channel binding, the packet data of the service flow can be simultaneously transmitted in multiple time slots of multiple upstream channels in a binding group. The correct reception of the service flow depends on the transmission performance of each upstream channel. Since the packet data transmitted through the multiple upstream channels in the binding group are related to each other, the performance degradation of a single upstream channel does not only affect the packet data transmission through the upstream channel itself, but also affects the packet data transmission through other upstream channels. In other words, the negative impact of the performance degradation of a single upstream channel on the binding group is not linear, but a greater degree of negative impact. According to the operation in FIG. 5, the aforementioned negative impact can be reduced or avoided, and in some embodiments, the transmission performance of the service flow of the user device can also be ensured by changing the upstream channel or the binding group.

Figure 6A:
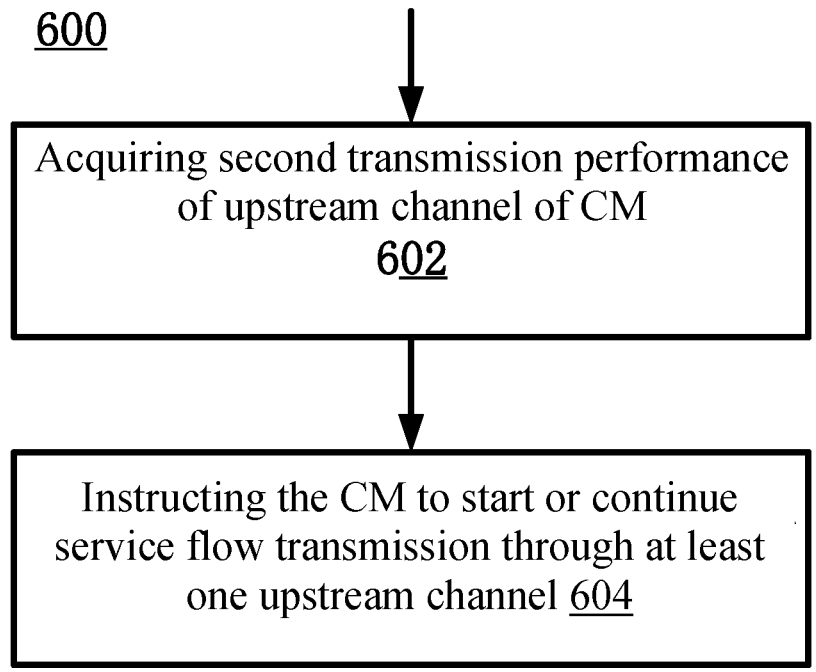
FIG. 6A and FIG. 6B show other exemplary processes for CMTS and CM respectively according to an embodiment of the present disclosure.

FIG. 6A shows another exemplary processing for CMTS according to an embodiment of the present disclosure. For example, the CMTS 102 in FIG. 1 may execute an exemplary operation 600 to communicate with the CM 104-1, thereby serving the user device 108-1.

As shown in FIG. 6A, the operation 600 includes that the CMTS 102 acquires second transmission performance of at least one upstream channel of the CM 104-1 (block 602). In an embodiment, the CMTS 102 may acquire corresponding transmission performance of a specific upstream channel based on receiving test message transmission from the CM 104-1 through the specific upstream channel. For example, the CM 104-1 may transmit a test message to the CMTS 102 through a specific upstream channel at certain time intervals. The operation 600 further includes that, in response to the second transmission performance of at least one upstream channel of the CM 104-1 being higher than a second threshold, the CMTS 102 instructs the CM 104 to start or continue service flow transmission through the at least one upstream channel (block 604).

In an embodiment, the second transmission performance may be similarly based on various performance indicators of the corresponding upstream channels, including but not limited to received signal to noise ratio, signal to interference plus noise power ratio, packet loss rate, and bit error rate. Correspondingly, second thresholds may be specified for these performance indicators respectively. For example, a second threshold $T2_{SNR}$ may be specified for the signal to noise ratio. The second threshold may indicate that the transmission performance on the corresponding upstream channel can meet the QoS requirements of the service flow. The second threshold may be conveyed by adding the parameter StartDataLowSNRThreshold or RecoverData-LowSNRThreshold in the DOCSIS specification, for example, and the CM 104 or the CMTS 102 may be configured with this parameter through the NMS 112, for example.

In an embodiment, the CMTS 102 may previously control the CM 104-1 to stop or suspend the service flow transmission through a specific upstream channel (for example, through the operation 400), and then control the CM 104-1 to start or continue the service flow transmission through the specific upstream channel through the operation 600. In another embodiment, the operation 600 may be performed independently, without necessarily being associated with the operation 400.

Figure 6B:
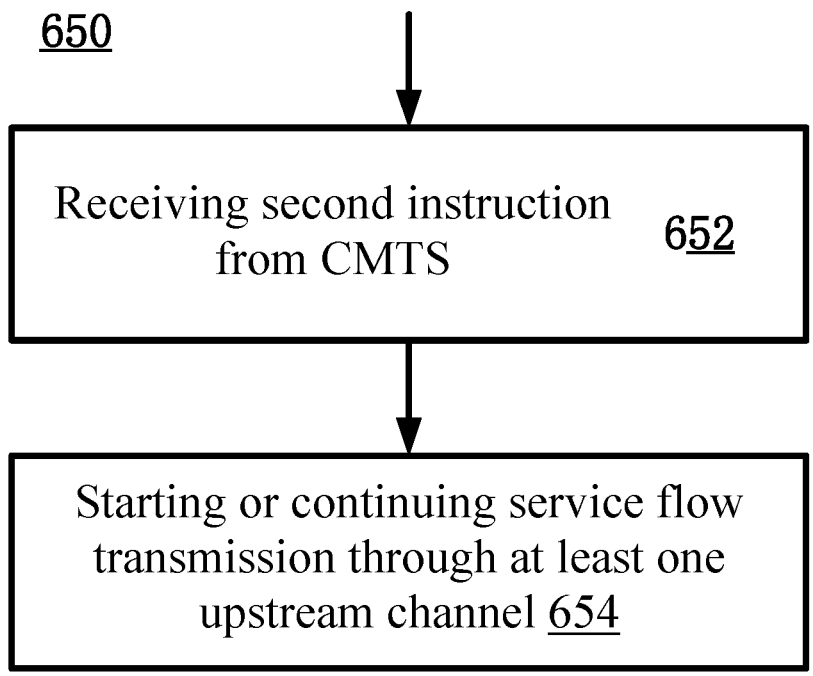

FIG. 6B shows another exemplary processing for CM according to an embodiment of the present disclosure. For example, the CM 104-1 in FIG. 1 may execute an exemplary operation 650 to communicate with the CMTS 102, thereby serving the user device 108-1.

As shown in FIG. 6B, the operation 650 includes that the CM 104 receives a second instruction from the CMTS 102 (block 652). In an embodiment, the second instruction is used to instruct the CM 104 to start or continue the service flow transmission through at least one upstream channel. The operation 650 further includes that, in response to receiving the second instruction, the CM 104 starts or continues the service flow transmission through the at least one upstream channel (block 654).

In an embodiment, the second instruction may correspond to a situation where the transmission performance of an upstream channel (for example, the upstream channel 151-1) of the CM 104-1 is improved. According to the operation 650, the control of the CMTS 102 can at least provide more channel selections for the CM 104-1.

Figure 7:
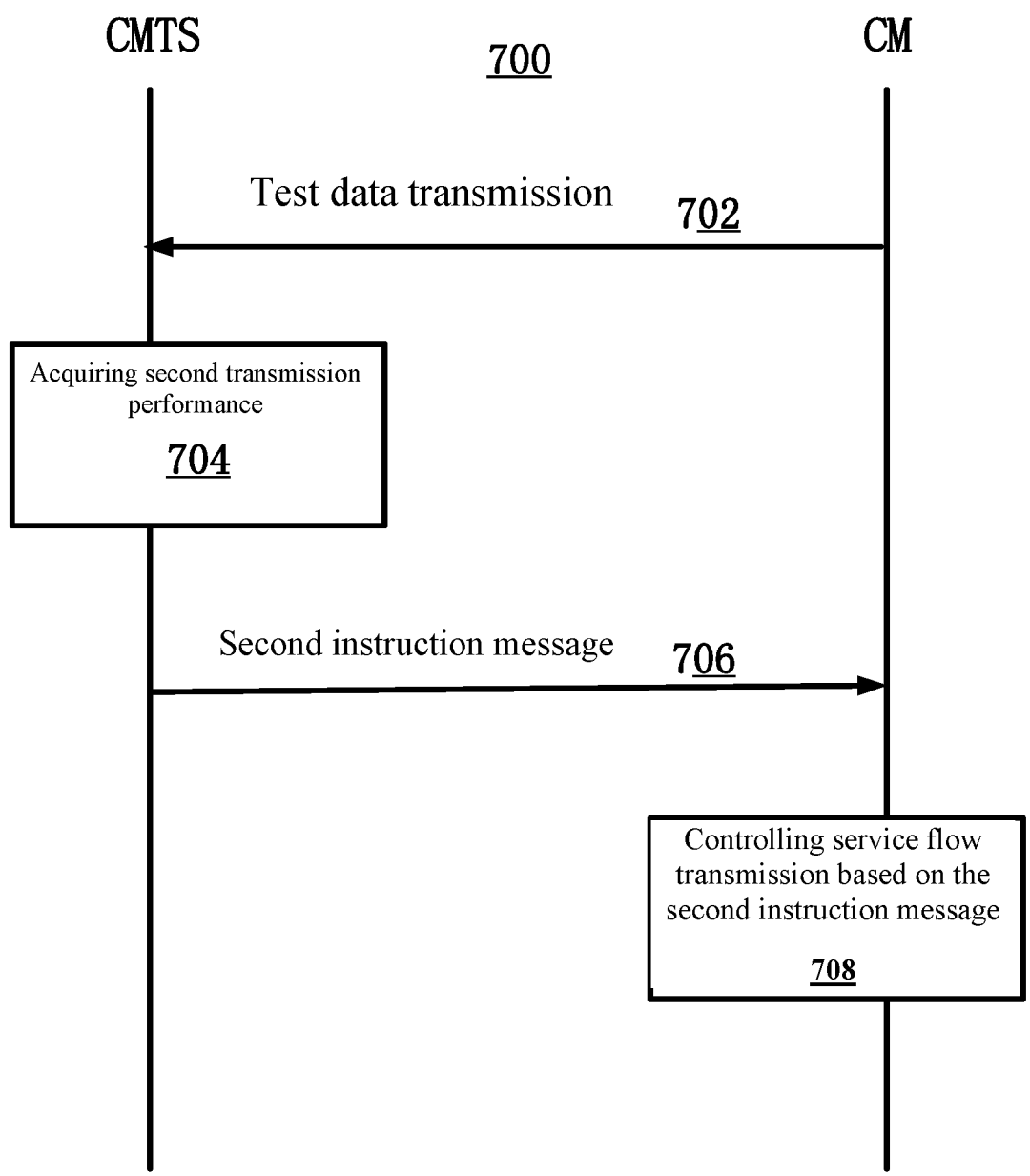
FIG. 7 shows another exemplary signaling flow between CMTS and CM according to an embodiment of the present disclosure.

FIG. 7 shows another exemplary signaling flow between CMTS and CM according to an embodiment of the present disclosure. For example, the signaling flow 700 can be executed between the CMTS 102 and the CM 104-1 in FIG. 1.

As shown in FIG. 7, in 702, the CM 104-1 may transmit test data to the CMTS 102. In an embodiment, the CM 104-1 may transmit test data through one or more upstream channel, so that the CMTS 102 can acquire the transmission performance of the corresponding upstream channel.

In 704, the CMTS 102 may acquire the second transmission performance of an upstream channel of the CM 104-1 based on receiving the test data transmission from the CM 104-1. Specifically, the CMTS 102 may acquire the second transmission performance of the upstream channel based on the reception on each upstream channel. In an embodiment, the second transmission performance is acquired based on receiving test message transmission through a corresponding upstream channel multiple times.

In 706, in response to the transmission performance of at least one upstream channel of the CM 104-1 being higher than a second threshold, the CMTS 102 may send a second instruction message to the CM 104-1. The second instruction message may be used to instruct the CM 104-1 to start or continue the service flow transmission through the at least one upstream channel. In an embodiment, the second instruction message is sent in response to the second transmission performance of at least one upstream channel being higher than the second threshold for a second time period. The second time period may be conveyed by adding the parameter StartDataLowSNRTimer or RecoverData-LowSNRTimer in the DOCSIS specification, for example, and the CM 104 or the CMTS 102 may be configured with this parameter through the NMS 112, for example. In an embodiment, sending the second instruction message may include indicating the information of the at least one upstream channel to the CM 104-1. Correspondingly, the CM 104-1 may start or continue the service flow transmission through the at least one upstream channel. Alternatively or additionally, sending the second instruction message may include re-authorizing one or more upstream channels for the service flow transmission to the CM 104-1. Re-authorization can provide the CM 104-1 with an opportunity to change the upstream channel to acquire better transmission performance.

In the embodiments where there is channel binding, when the transmission performance of the upstream channel 151-1 is improved, sending the second instruction message may include instructing the CM 104-1 to perform service flow transmission through a third binding group, where the third binding group includes the upstream channel 151-1. For example, the third binding group may include the upstream channels 151-1, 151-2, and one or more other upstream channels.

In 708, the CM 104-1 receives the second instruction message from the CMTS 102, and controls the service flow transmission based on the second instruction message. For example, in response to receiving the second instruction message, the CM 104-1 may start or continue the service flow transmission through at least one upstream channel. In the embodiments where there is channel binding, the CM 104-1 may perform service flow transmission through a third binding group, where the third binding group includes the upstream channel 151-1.

The present disclosure may be implemented as any combination of devices, systems, integrated circuits, and computer programs on non-transitory computer-readable media. one or more processors may be implemented as an integrated circuit (IC), an application specific integrated circuit (ASIC) or a large-scale integrated circuit (LSI), a system LSI, a super LSI, or an ultra LSI component that performs some or all of the functions described in the present disclosure.

The present disclosure includes the use of software, applications, computer programs, or algorithms. Software, application programs, computer programs or algorithms can be stored on a non-transitory computer readable medium, so that a computer with one or more processors can execute the aforementioned steps and the steps described in the drawings. For example, one or more memories store software or algorithms by executable instructions, and one or more processors can associate a set of instructions executing the software or algorithms to perform wireless network access control according to the embodiments described in this disclosure.

Software and computer programs (may also be called programs, software applications, applications, components, or codes) include machine instructions for programmable processors, and may be realized in high-level procedural languages, object-oriented programming languages, functional programming languages, logic programming languages, or assembly languages or machine languages. The term "computer-readable medium" refers to any computer program product, apparatus or device used to provide machine instructions or data to the programmable data processor, e.g., magnetic disks, optical disks, solid-state storage devices, memories, and programmable logic devices (PLD), including computer-readable media that receive machine instructions as computer-readable signals.

For example, the computer-readable medium may include the dynamic random access memory (DRAM), random access memory (RAM), read-only memory (ROM), electrically erasable read-only memory (EEPROM), compact disk read-only memory (CD-ROM) or other optical disk storage devices, magnetic disk storage devices or other magnetic storage devices, or any other medium that can be used to carry or store the required computer-readable program codes in the form of instructions or data structures and can be accessed by a general-purpose or special-purpose computer or a general-purpose or special-purpose processor. As used herein, magnetic disks or disks include compact discs (CDs), laser disks, optical disks, digital versatile discs (DVDs), floppy disks, and Blu-ray disks, wherein magnetic disks usually copy data magnetically, and disks copy data optically via laser. Combinations of the above are also included in the scope of computer-readable media.

In one or more embodiments, the use of the words "able", "can", "operable as" or "configured as" refers to some devices, logics, hardware and/or components designed to be used in a specified manner. The subject matter of the present disclosure is provided as an example of the apparatus, system, method, and program for performing the features described in the present disclosure. However, in addition to the aforementioned features, other features or modifications can be expected. It can be expected that any emerging technology that may replace any of the aforementioned implementation technologies may be used to complete the implementation of the components and functions of the present disclosure.

In addition, the above description provides examples without limiting the scope, applicability, or configuration set forth in the claims. Without departing from the spirit and scope of the present disclosure, changes may be made to the functions and layouts of the discussed components. Various embodiments may omit, substitute, or add various processes or components as appropriate. For example, features described with respect to some embodiments may be combined in other embodiments.

Similarly, although operations are depicted in a specific order in the attached drawings, this should not be understood as a requirement that such operations should be executed in the specific order shown or in the sequential order, or that all illustrated operations be executed to achieve the desired result. In some cases, multi-tasking and parallel processing can be advantageous.

The invention claimed is:

1. An electronic device for a cable modem termination system (CMTS), the electronic device comprising:
    a memory having instructions stored thereon; and
    one or more processors configured to execute the instructions to cause the CMTS to perform operations comprising:
        acquiring first transmission performance of an upstream channel of a cable modem (CM) based on receiving service flow transmission from the CM;
        in response to the first transmission performance of at least one upstream channel of the CM being lower than a first threshold, instructing the CM to stop or suspend the service flow transmission through the at least one upstream channel; and
        wherein the at least one upstream channel and one or more other upstream channels form a first binding group, and wherein the operation of instructing to stop or suspend comprises:
            instructing the CM to stop or suspend service flow transmission through the first binding group; or
            instructing the CM to perform service flow transmission through a second binding group, where the second binding group does not comprise the at least one upstream channel.

2. The electronic device according to claim 1, wherein the operation of instructing to stop or suspend comprises:

indicating information of the at least one upstream channel to the CM to cause the CM to stop or suspend the service flow transmission through the at least one upstream channel; or re-authorizing one or more upstream channels for service flow transmission to the CM.

3. The electronic device according to claim 1, wherein the operations further comprise:

acquiring second transmission performance of the at least one upstream channel based on receiving test message transmission from the CM;

in response to the second transmission performance of the at least one upstream channel being higher than a second threshold, instructing the CM to start or continue the service flow transmission through the at least one upstream channel.

4. The electronic device according to claim 3, wherein the operation of instructing to start or continue comprises:

indicating information of the at least one upstream channel to the CM to cause the CM to start or continue the service flow transmission through the at least one upstream channel; or re-authorizing one or more upstream channels for service flow transmission to the CM.

5. The electronic device according to claim 3, wherein the at least one upstream channel and one or more other upstream channels are bound as a first binding group, the operation of instructing to start or continue comprises:

instructing the CM to perform service flow transmission through a third binding group, where the third binding group comprises the at least one upstream channel.

6. The electronic device according to claim 3, wherein at least one of the following exists:

the first transmission performance is acquired based on receiving service flow transmission through a corresponding upstream channel multiple times;

the second transmission performance is acquired based on receiving test message transmission through a corresponding upstream channel multiple times;

the instruction of stopping or suspending is in response to the first transmission performance of the at least one upstream channel being lower than a first threshold for a first time period; or the instruction of starting or continuing is in response to the second transmission performance of the at least one upstream channel being higher than a second threshold for a second time period.

7. An electronic device for a cable modem (CM), the electronic device comprising:

a memory having instructions stored thereon; and one or more processors configured to execute the instructions to cause the CM to perform operations comprising:

receiving a first instruction from a cable modem termination system (CMTS) during transmission of service flow through an upstream channel;

in response to receiving the first instruction, stopping or suspending the service flow transmission through the at least one upstream channel; and wherein the at least one upstream channel and one or more other upstream channels form a first binding group, and wherein stopping or suspending the service flow transmission comprises:

stopping or suspending service flow transmission through the first binding group; or performing service flow transmission through a second binding group, where the second binding group does not comprise the at least one upstream channel.

8. The electronic device according to claim 7, wherein the operations further comprise:

receiving a second instruction from the CMTS; and in response to receiving the second instruction, starting or continuing the service flow transmission through the at least one upstream channel.

9. The electronic device according to claim 8, wherein the first instruction or the second instruction from the CMTS comprises at least one of the following:

information of the at least one upstream channel; or re-authorization of one or more upstream channels for service flow transmission.

10. The electronic device according to claim 8, wherein the at least one upstream channel and one or more other upstream channels form a first binding group, starting or continuing the service flow transmission comprises:

performing service flow transmission through a third binding group, where the third binding group comprises the at least one upstream channel.

11. A method for a cable modem termination system (CMTS), comprising:

acquiring first transmission performance of an upstream channel of a cable modem (CM) based on receiving service flow transmission from the CM;

in response to the first transmission performance of at least one upstream channel of the CM being lower than a first threshold, instructing the CM to stop or suspend the service flow transmission through the at least one upstream channel; and wherein the at least one upstream channel and one or more other upstream channels form a first binding group, and wherein stopping or suspending the service flow transmission comprises:

stopping or suspending service flow transmission through the first binding group; or performing service flow transmission through a second binding group, where the second binding group does not comprise the at least one upstream channel.

12. The method according to claim 11, further comprising:

acquiring second transmission performance of the at least one upstream channel based on receiving test message transmission from the CM;

in response to the second transmission performance of the at least one upstream channel being higher than a second threshold, instructing the CM to start or continue the service flow transmission through the at least one upstream channel.

13. The method according to claim 12, wherein the at least one upstream channel and one or more other upstream channels are bound as a first binding group, the operation of instructing to start or continue comprises:

instructing the CM to perform service flow transmission through a third binding group, where the third binding group comprises the at least one upstream channel.

14. A method for a cable modem (CM), comprising:

receiving a first instruction from a cable modem termination system (CMTS) during transmission of service flow through an upstream channel;

in response to receiving the first instruction, stopping or suspending the service flow transmission through at least one upstream channel; and wherein the at least one upstream channel and one or more other upstream channels form a first binding group, and wherein stopping or suspending the service flow transmission comprises:
  stopping or suspending service flow transmission through the first binding group; or
  performing service flow transmission through a second binding group, where the second binding group does not comprise the at least one upstream channel.

15. The method according to claim 14, further comprising:
  receiving a second instruction from the CMTS; and
  in response to receiving the second instruction, starting or continuing the service flow transmission through the at least one upstream channel.

16. The method according to claim 14, wherein in a case the at least one upstream channel and one or more other upstream channels form a first binding group, starting or continuing the service flow transmission comprises:
  performing service flow transmission through a third binding group, where the third binding group comprises the at least one upstream channel.

\* \* \* \* \*